B. C. HEATER.
BRICKMAKER'S TRUCK.
APPLICATION FILED AUG. 8. 1910.
985,259.
Patented Feb. 28, 1911.
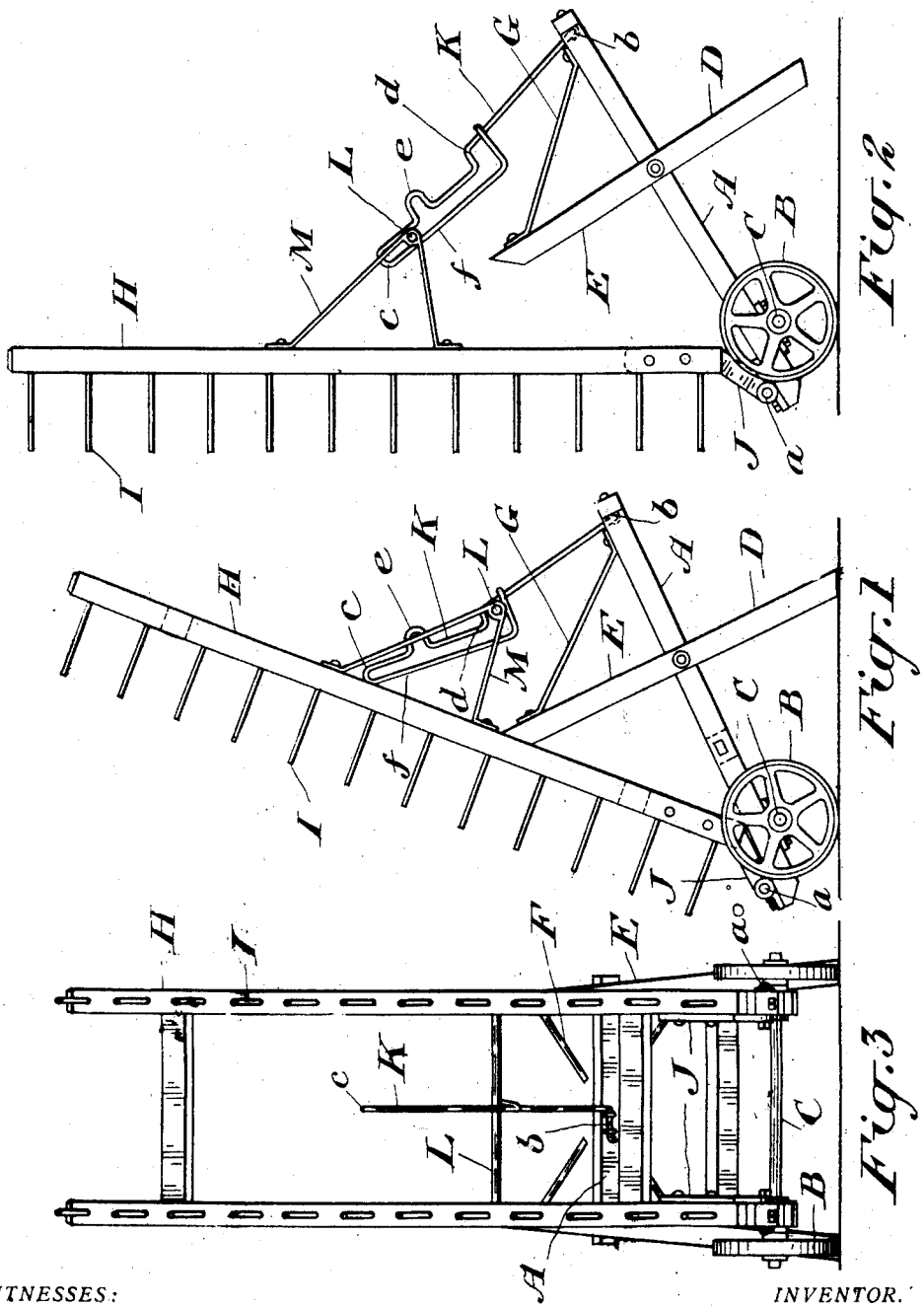
WITNESSES:
INVENTOR.
B. C. Heater
BY Rixout & Maybee
ATTORNEY:

UNITED STATES PATENT OFFICE.

BERTNEY C. HEATER, OF MINTO TOWNSHIP, WELLINGTON COUNTY, ONTARIO, CANADA

BRICKMAKER'S TRUCK.

985,259.   Specification of Letters Patent.   Patented Feb. 28, 1911.

Application filed August 8, 1910.   Serial No. 576,236.

*To all whom it may concern:*

Be it known that I, BERTNEY C. HEATER, of the township of Minto, Drew P. O., county of Wellington, in the Province of Ontario, Canada, have invented certain new and useful Improvements in Brickmakers' Trucks, of which the following is a specification.

This invention relates to trucks adapted to carry a plurality of pallets of bricks and to lift them on or off the drying racks.

The present truck is specially designed to lift the pallets from an elevator, such as shown and described in my co-pending application No. 576,235, for transportation to suitable racks onto which, by suitable manipulation of the truck they may be deposited.

My improved truck comprises a truck frame provided with a pair of wheels and a rack pivotally connected to the truck forward of the wheels, means being provided, preferably adjustable, for limiting the swing of the rack substantially as hereinafter more specifically described and illustrated in the accompanying drawings in which—

Figure 1 is a side elevation of a truck constructed in accordance with my invention. Fig. 2 is a side elevation showing the truck in the position it occupies when the rack is in position to lift a load of pallets, and Fig. 3 is a front elevation.

In the drawings like letters of reference indicate corresponding parts in the different figures.

A is the truck frame of any suitable shape and material which is provided with a pair of wheels B on the axle C journaled on the truck frame.

D are the legs of the truck secured to the truck frame and preferably extended upward to form the stops E, the purpose of which will hereinafter appear. The stops are preferably provided with cross braces F and the rear braces G.

H is a rack provided with a series of pairs of projecting fingers I. These fingers are adapted to support a series of pallets loaded with brick. It will be noted that the lower end of the rack, when the truck is in standing position as shown in Fig. 1, is substantially over the axis on which the wheels turn. The lower end of the rack is provided with a pair of arms J extending forwardly and an angle to the side of the rack and pivotally connected with the truck frame A forward of the axis of the wheels. This forms an important feature of the construction of the apparatus, since when the truck is in the position shown in Fig. 2 the pivots $a$ are substantially below the middle points of the fingers I and the load on the fingers I is thus substantially balanced over the pivots. The rack is therefore easily managed as it has no decided tendency to tip over one way or the other. The arms J also perform another function. When the truck is in its normal wheeling position, which is intermediate the two positions illustrated, the load on the rack is substantially balanced over the axis of the wheels and the strain on the user is reduced to a minimum. The stops E, it will be seen from Fig. 1, limit the rearward swing of the rack. Its forward swing is limited by the bent rod K, which is hinged at $b$ on the rear member of the frame A. The loop $c$ at the end of this rod is engaged by the bar L secured to the rack by means of the brackets M, if the rack tends to tip over toward the front. This rod is bent to form a shoulder $d$ which engages the bar L to releasably hold the rack back against the stops E. Intermediate the shoulder $d$ and the bent end of the rod a loop $e$ is preferable with which the bar L may be engaged if it is desired to wheel the truck with the rack in substantially a vertical position as may be necessary when a load of pallets is to be transferred to or removed from some of the racks employed by brick makers.

The operation of the device is substantially as follows: When the truck is in the position shown in Fig. 2 the fingers I may be introduced below a series of pallets upon a rack. By steadying the rack and swinging down the truck frame until the legs touch the ground, the rack will be elevated and a load of pallets raised. The rack is then tipped back to the position shown in Fig. 1 when the operator may wheel the truck to any desired position where a reversal of the process will deposit the load of pallets upon any desired rack. The rod K is preferably bent back upon itself to form the guard $f$ which prevents it disengaging itself from the bar L. This truck will also find a use in handling and placing brick for brick layers and also for many other purposes.

What I claim as my invention is:—

1. In a truck, the combination of a wheeled truck frame, and an upwardly inclined rack pivotally secured at its lower end to the truck frame forward of the wheel axis thereof and at a point permitting the rack to swing on its pivot while remaining in a substantially vertical plane.

2. In a truck, the combination of a wheeled truck frame, an upwardly inclined rack provided with transversely extending load supporting members, the said rack being pivotally secured at its lower end to the truck frame forward of the wheel axis thereof and at a point permitting the rack to swing on its pivot while remaining in a substantially vertical plane with the load supporting members substantially horizontal.

3. In a truck, the combination of a wheeled truck frame, a rack, means pivotally connecting the lower end thereof with the truck frame at a point forward of the axis of the wheels of said truck and substantially below the load center of the rack when the latter is raised to a vertical position.

4. In a truck, the combination of a wheeled truck frame, a rack having its lower end substantially over the wheel axis thereof, means extending from said end at an angle thereto pivotally connecting said rack with the truck frame at a point forward of the wheel axis and substantially below the load center of the rack when the latter is raised to vertical position, and means limiting the backward and forward swing of the rack.

5. In a truck, the combination of a wheeled truck frame, an upwardly inclined rack, means at the lower end thereof, extending therefrom at an angle, and pivotally connecting said rack to said truck frame at a point forward of the wheel axis thereof, said rack when in vertical loading and unloading position having its load center substantially over said pivotal point and when in inclined wheeling position, being substantially vertical and having its load center substantially over the wheel axis of the track, and means limiting the forward and backward movement of said rack.

6. In a truck the combination of a wheeled truck frame; a rack having its lower end substantially over the wheel axis thereof and pivotally connected with the truck forward of the axis of the wheels; stops limiting the backward swing of the rack; and a lock adapted to engage the rack in either of two positions to limit the forward swing of the rack.

7. In a truck the combination of a wheeled truck frame; a rack having its lower end substantially over the wheel axis; arms secured to said end extending forward at an angle to the rack and pivoted on the truck frame forward of the line of the said axis; and stops limiting the backward swing of the rack.

Toronto, Ont., this 30th day of July, 1910.

BERTNEY C. HEATER.

Signed in the presence of—
J. Edw. Maybee.
E. P. Hall.